(12) United States Patent
Abeles et al.

(10) Patent No.: US 9,158,587 B2
(45) Date of Patent: Oct. 13, 2015

(54) FLEXIBLE TASK AND THREAD BINDING WITH PREFERRED PROCESSORS BASED ON THREAD LAYOUT

(75) Inventors: James Abeles, Burtonsville, MD (US); Farid A. Parpia, Lake Katrine, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/353,877

(22) Filed: Jan. 19, 2012

(65) Prior Publication Data

US 2013/0191837 A1    Jul. 25, 2013

(51) Int. Cl.
G06F 9/455 (2006.01)
G06F 9/46 (2006.01)
G06F 9/50 (2006.01)

(52) U.S. Cl.
CPC ............ G06F 9/5005 (2013.01); G06F 9/5011 (2013.01); G06F 2209/5018 (2013.01)

(58) Field of Classification Search
None
See application file for complete search history.

(56) References Cited

U.S. PATENT DOCUMENTS

| | | | |
|---|---|---|---|
| 6,477,561 | B1 | 11/2002 | Robsman |
| 6,658,447 | B2 | 12/2003 | Cota-Robles |
| 7,389,506 | B1 | 6/2008 | Miller et al. |
| 2009/0320031 | A1 | 12/2009 | Song |
| 2010/0031266 | A1 | 2/2010 | Raspl et al. |
| 2010/0205602 | A1 | 8/2010 | Zedlewski et al. |
| 2011/0119674 | A1 * | 5/2011 | Nishikawa ................ 718/103 |

OTHER PUBLICATIONS

Fahrig, T. D. I. et al. (Microsoft) (Jun. 2009), Efficient load balancing of threads in multiprocessor schedulers. pp. 1-7. IP.com No. IPCOM000184406D.
IBM (Aug. 2009). Extended thread borrowing for NUMA computer system load balancing. pp. I-2. IP.com No. IPCOM000I86508D.
IBM TBD. (Apr. 2000). Method for a worker thread to start copies of itself to handle half of its load when overloaded. pp. 1-2. IP.com No. IPCOM0000I2985D.
Disclosed Anonymously (Feb. 2007). An open MP extension for architecture aware thread scheduling. pp. 1-3. IP.com No. IPCOM000I46571D.
Luo et al. (Sep. 2010).Energy efficient speculative threads: dynamic thread allocation in same—ISA heterogeneous multicore systems. PACT'10, 453-464.

(Continued)

*Primary Examiner* — Abdullah Al Kawsar
*Assistant Examiner* — Bradley Teets
(74) *Attorney, Agent, or Firm* — Cantor Colburn LLP; Steven Chiu (57) ABSTRACT

Embodiments of thread binding are provided. An aspect includes generating a thread layout for an application. Another aspect includes determining a task count for the application; determining a task rank for each task of the task count; determining a thread count for each task associated with the application, wherein a thread count for a first task associated with the application is unequal to a thread count of a second task associated with the application; and indicating one or more preferred processors of a plurality of processors for each task associated with the application. Another aspect includes allocating system for each of the tasks of the application based on the thread layout. Another aspect includes affinitizing the tasks by generating child threads for each of the tasks, wherein a number of threads generated for each task corresponds to the thread count for the task in the thread layout.

4 Claims, 3 Drawing Sheets

(56) References Cited

OTHER PUBLICATIONS

Ogasawara (2008). Dynamic Thread Count Adaptation for Multiple Services in SMP Environm ents. IEEE International Conference on Web Service s, 585-592.

Weij et al. (2009). Dynamic Thread assignment in Web server performance optimization. pp. 1-12.

* cited by examiner

FLEXIBLE TASK AND THREAD BINDING WITH PREFERRED PROCESSORS BASED ON THREAD LAYOUT

BACKGROUND

The present invention relates to parallel computing, and more specifically, to systems, methods and computer program products for flexible per-task thread counts and thread binding.

Large scale applications, such as scientific applications, can run hundreds or thousands of processes (i.e., tasks) in parallel on clusters of symmetric multiprocessors (SMPs). For these large scale applications, parallel computing techniques are implemented to provide parallelism. One type of parallelism employs a message passing interface (MPI) in which multiple processes, each having its own memory, are implemented for the tasks, and data sharing and synchronization are achieved through passing messages between the tasks. Another type of parallelism is threading. A third type of parallelism, hybrid parallelism, simultaneously combines both task and thread parallelism: multiple threads can exist within each task. A thread is the smallest unit of processing that can be scheduled by an operating system, and a thread is contained within a process. Threading and multi-threading can occur on one processor having one memory. On a single processor, multithreading generally occurs by time-division multiplexing, in which the processor switches between different threads. This context switching generally happens frequently enough that the user perceives the threads or tasks as running at the same time. Threading or multi-threading can also occur over multiple processors. On a multiprocessor system, the threads or tasks actually run at the same time, with each processor or core running a particular thread or task. Each processor has access to shared memories.

The individual tasks of large scale applications are often multi-threaded with a thread count that is uniform for all tasks. The situation in which the problem cannot be easily further decomposed among tasks can restrict the scalability of the particular application. If a time-to-solution is specified, real-time constraints can fail.

SUMMARY

Exemplary embodiments include a computer program product for thread binding. The computer program product includes a tangible storage medium readable by a processing circuit and storing instructions for execution by the processing circuit for performing a method. The method includes generating a thread layout for processors in a computing system, allocating system resources for tasks of an application allocated to the processors, affinitizing the tasks and generating threads for the tasks. A thread count for each of the tasks is at least one and may be equal or unequal to that of the other tasks.

Additional exemplary embodiments include a computer-implemented method for thread binding. The method includes generating a thread layout for processors in a computing system, allocating system resources for tasks of an application allocated to the processors, affinitizing the tasks and generating threads for the tasks. A thread count for each of the tasks is at least one and may be equal or unequal to that of the other tasks.

Further exemplary embodiments include a computer system for thread binding. The system includes processors communicatively coupled to an interconnect fabric and a memory operatively coupled to each of processors. The system is configured to perform a method including generating a thread layout for processors in a computing system, allocating system resources for tasks of an application allocated to the processors, affinitizing the tasks and generating threads for the tasks. A thread count for each of the tasks is at least one and may be equal or unequal to that of the other tasks.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein implement a flexible per-task thread count and binding, permitting the allocation of additional computational resources to tasks that carry larger computational loads. As such, computation is not limited by uniform thread counts. Large-scale applications execute quicker with flexible per-task thread counts, that is, different thread counts for different tasks when needed, as compared to a requirement of uniform thread counts in conventional multi-threaded hybrid parallelism. For example, supercomputing clusters are often implemented for large scale scientific applications. As such, the efficiency of the supercomputing clusters is increased with the flexible thread count. The systems and methods described herein introduce a level of indirection into a job startup. Instead of directly launching a user executable under the batch scheduler, the scheduler starts a launch tool. Based on user-specified options, the launch tool establishes the thread count (and any additional runtime status such as prescribing child thread affinitizations) in the runtime environment. The launch tool subsequently execs the job executable (i.e., the launch tool causes the operating system to replace itself by the job executable). Since the runtime environment is appropriately modified, each task starts with the appropriate thread count and other properties. Any batch-scheduling system can assume the additional functionality currently provided by the launch tool. For example, a keyword/value combination could be used to specify the desired thread-per-task information. In this way, the systems and methods described herein enable tasks to be run on multiple processors, each of the tasks having different thread count. For example, for an MPI application one processor can have a thread count of one and another processor can have a thread count of five.

The systems and methods described herein can be implemented in any suitable computing system that can be part of a larger parallel computing system.

Figure 1:
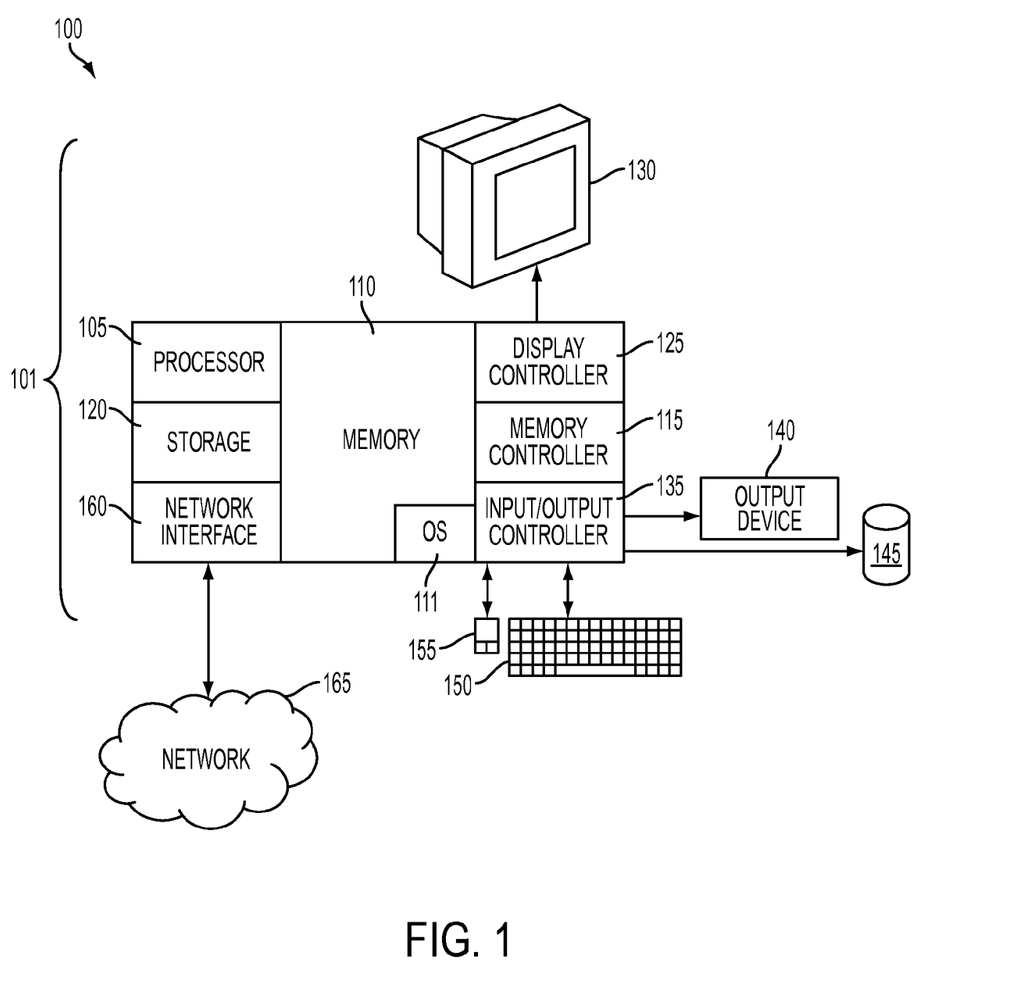
FIG. 1 illustrates an exemplary embodiment of a system that can be implemented for the flexible task and thread binding methods described herein.

FIG. 1 illustrates an exemplary embodiment of a system 100 that can be implemented for the flexible task and thread binding methods described herein. The methods described herein can be implemented in software firmware, hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the flexible task and thread binding methods described herein in accordance with exemplary embodiments and a suitable operating system (OS) 111. The OS 111 essentially controls the execution of other computer programs, such the flexible task and thread binding systems and methods as described herein, and provides scheduling, input-output control, file and data management, memory management, and communication control and related services.

The flexible task and thread binding methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the flexible task and thread binding methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The flexible task and thread binding methods described herein and the OS 111, in whole or in part, but typically the latter, are read by the processor 105, perhaps buffered within the processor 105, and then executed.

Figure 2:
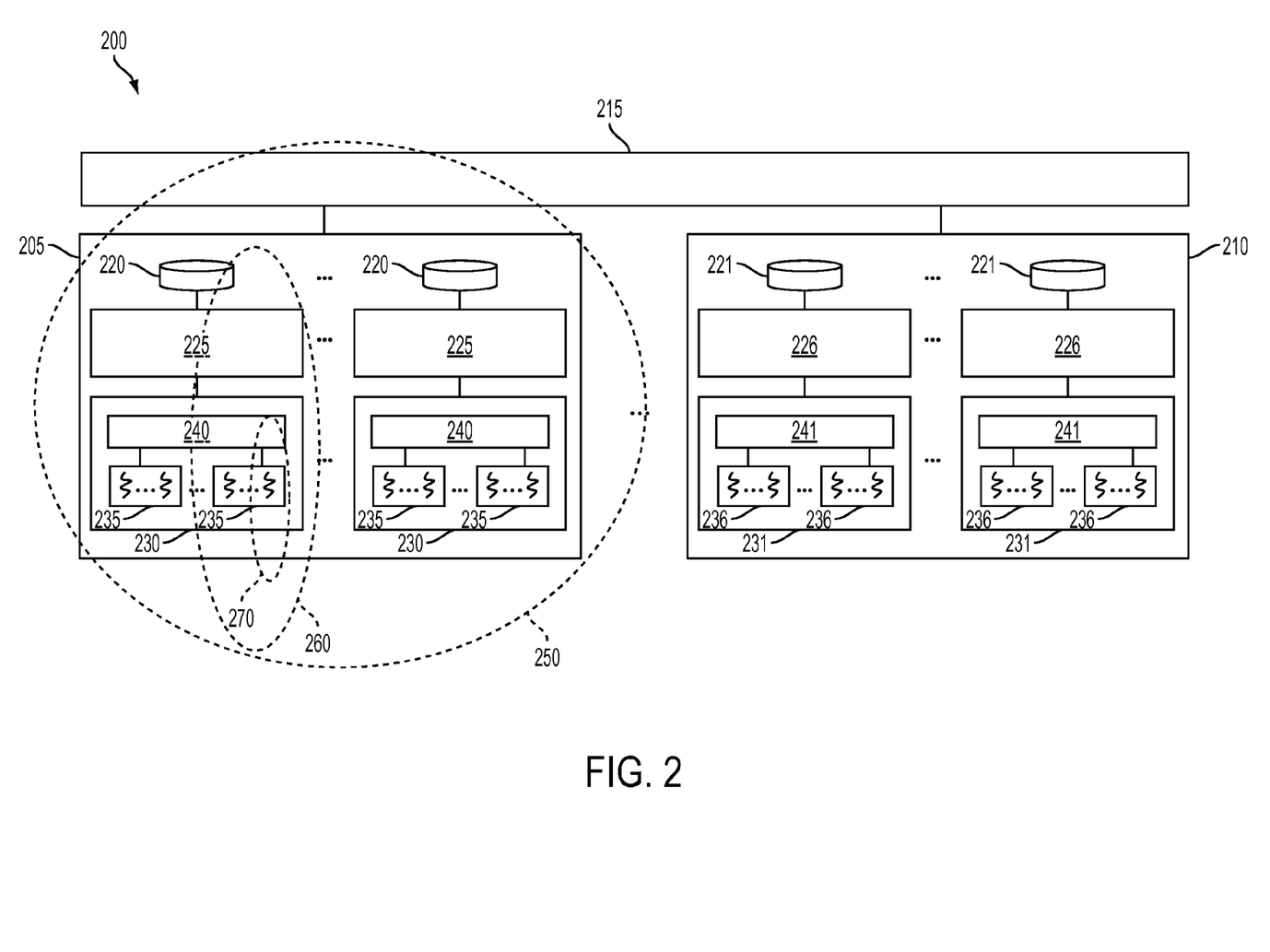
FIG. 2 illustrates an exemplary parallel computing cluster in which the exemplary flexible task and thread binding methods can be implemented.

FIG. 2 illustrates an exemplary parallel computing cluster 200 in which the exemplary flexible task and thread binding methods can be implemented. The system 200 includes one or more computing systems (nodes) 205, 210, which can be communicatively coupled to any suitable communication network (i.e., interconnect fabric) 215, which supports parallel computing as described herein. The computing nodes 205, 210 each include storage 220, 221, affine memory domains 225, 226, and processors 230, 231. Each of the processors 230, 231 can have multiple cores 235, 236, each supporting hardware threads as described herein. The cores 235, 236 each also include an associated affine cache 240, 241. In exemplary embodiments, the nodes support processor affinity, which is a modification of the native central queue scheduling algorithm in a symmetric multiprocessing operating system, such as the nodes 205, 210. Each task (whether a process or thread) in the queue has a tag indicating its preferred processor. At allocation time, each task is allocated to its preferred processor in preference to other processors. For example, as illustrated, the system 200 supports a job resource subset 250, a task resource subset 260 and a thread resource subset 270. It can be appreciated that the subsets 250, 260, 270 are just an example of how resources in the system 200 can be allocated for a given application.

Figure 3:
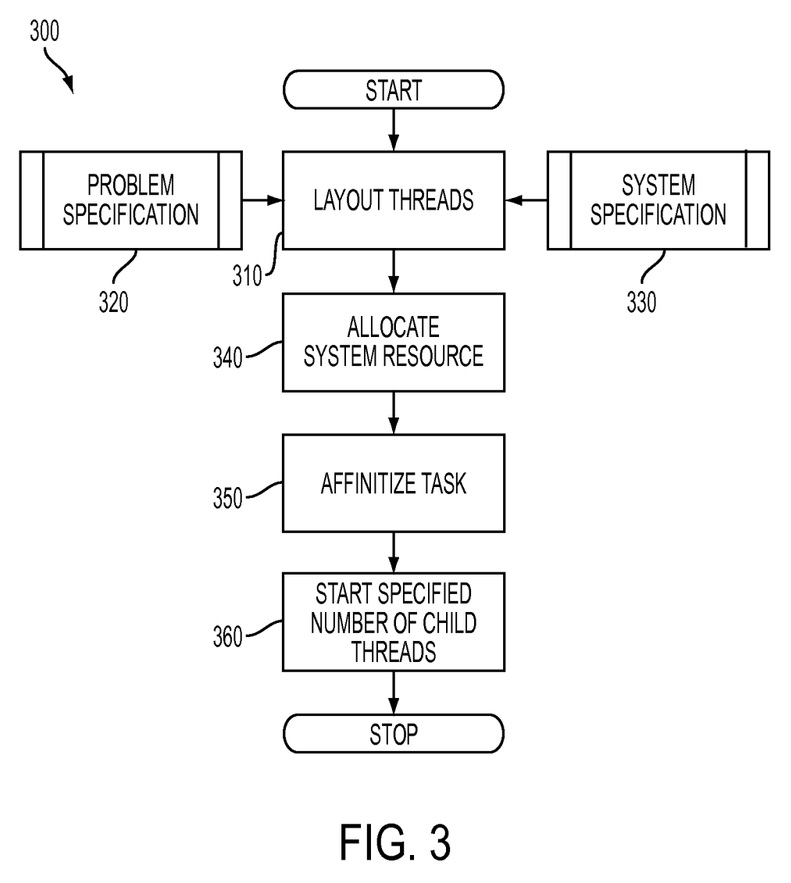
FIG. 3 illustrates a flow chart of a method for flexible task and thread binding in accordance with exemplary embodiments.

FIG. 3 illustrates a flow chart of a method 300 for flexible task and thread binding in accordance with exemplary embodiments. At block 310, the system 200 lays out the threads for the application. In exemplary embodiments, thread layout includes but is not limited to: determining a task count; generating a task-to-system resource map; calculating a per-task thread count; and generating a thread-to-system-resource map. In laying out the threads, both a problem specification at block 320 and a system specification at block 330 are determined. The problem specification includes but is not limited to: an algorithm; a domain size; domain decomposition; and a resolution. The system specification includes but is not limited to: a processor layout; a memory layout; a node boundary; and an interconnect fiber. As such, it can be appreciated that thread layout determination is dependent on both the application and the system in which the application is run.

At block 340, the system 300 allocates resources, propagates the thread layout information to each task's environment, as determined at block 310, and starts tasks. In exemplary embodiments, job resources, which are the union of all individual thread resources, are allocated by the parallel operating environment (i.e., the system 200) to the job. At block 350, each parallel task affinitizes itself to system resource subsets that are allocated to the threads that will be created by the task, and based on the thread layout. At block 360, each parallel task starts a specified number of child threads. In exemplary embodiments, each of the child threads affinitizes itself to the system resource subsets based again on the thread layout. In exemplary embodiments, as each child thread is started, it affinitizes or reaffinitizes itself to the resources under which it will run.

Thread allocation is typically for a fixed number of threads per task. The user can set an environment variable. The system 200 can propagate the environment variable into the environment for every task that the system 200 allocates and starts. Because the thread count is constant for each task, a calculation establishes the target processor identifier (i.e., the CPUID) for each task, and each thread created by each task. Each task is also affinitized. In addition and, wherever threads are created in the system 200, the threads are always affinitized.

In exemplary embodiments, when the number of threads can be different for every task, the bookkeeping for the problem and the information propagated to the tasks that are started are more complex. The user specifies the target CPUID for every thread that will be created. In exemplary embodiments, the problem constraints and the system constraints are combined to automatically generate the information.

In one example, an application may need two nodes, each of which has eight processors that are numbered 0 through 7, and the user wants to start with seven tasks on each of the two nodes. Task1, Task3, Task4, and Task5 need one thread per task. Task2 needs two threads, Task0 needs three threads, and Task6 needs seven threads. In exemplary embodiments, one way to represent all this information is as follows:

```
({0, 1, 2} {3} {4, 5}, {6}, {7}), ({0}, {1, 2, 3, 4, 5, 6, 7}   <--- Thread Map
    3        1    2    1    1          1           7            <--- Thread count
    0        1    2    3    4          5           6            <--- Task rank
```

In the example, the thread map is a representation of a thread map allocated in the system. The thread count for each task is the thread count within the curly braces of the thread map. The task rank is allocated for each of the task. It can be appreciated that the example is minimal for illustrative purposes and that numerous iterations and examples are contemplated. In the example, the data in each pair of parentheses in the thread map is the complete specification for one node; two pairs of parentheses imply two nodes. Each pair of curly braces is the specification for one task; there are five tasks on the first node and two tasks on the second. As a more specific example, Task2 has two threads, which are affinitized to CPUIDs 4 and 5, respectively. The system 200 (i.e., runtime environment), among other thing, sets an environment variable that specifies the task rank in each task's environment, so each task "knows" which pair of curly braces it must look at to get the target CPUIDs for its threads.

In exemplary embodiments, UNIX-like kernels are able to replace one process image by another process image implementing an exec family of calls.

The exec family of functions shall replace the current process image with a new process image. The new image shall be constructed from a regular, executable file called the new process image file. There shall be no return from a successful exec, because the calling process image is overlaid by the new process image. As such, the exec family calls replace a sequence, "parallel environment starts parallel task", with a sequence "parallel environment starts tool which in turn starts parallel task". In exemplary embodiments, the tool is a function that implements the data representation described above (i.e., the thread map, thread map and thread count) to set environment variables that specify the number of threads and the CPUIDs to which those threads are to be affinitized on which to start. The tool then affinitizes itself to the first CPUID in the list, and execs the parallel task. Since affinitization is inherited across an exec function, the parallel task starts up affinitized. When the first parallel section is reached, the correct number of parallel threads is started, and each parallel thread affinitizes itself to the correct CPUID. In this way, the systems and methods described herein enable tasks to be run on multiple processors, each of the tasks having different thread count and appropriate affinitization. For example, for an MPI application one processor can have a thread count of one and another processor can have a thread count of five.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A computer program product for thread binding, the computer program product comprising:

a non-transitory tangible storage medium readable by a processing circuit of a computer system and storing instructions for execution by the processing circuit for performing a method comprising:

before starting execution of an application, generating a thread layout for the application, wherein generating the thread layout for the application before starting execution of the application comprises:

determining a task count comprising a number of tasks required to execute the application, wherein a plurality of tasks is required to execute the application, and the task count corresponds to the number of the plurality of tasks;

determining a task rank for each task of the plurality of tasks;

determining a thread count for each task of the plurality of tasks, each thread count comprising a number of threads required to execute the thread count's respective task, wherein a thread count for a first task of the plurality of tasks is unequal to a thread count of a second task of the plurality of tasks; and indicating one or more preferred processors of a plurality of processors in the computer system for each task of the plurality of tasks, wherein a first task of the plurality of tasks requires a plurality of threads to execute, wherein a first processor is indicated as a preferred processor for a first thread of the plurality of threads required to execute the first task of the plurality of tasks, and wherein a second processor that is distinct from the first processor is indicated as a preferred processor for a second thread of the plurality of threads required to execute the first task;

allocating system resources, the system resources comprising the plurality of processors, for each of the tasks of the plurality of tasks based on the generated thread layout by affinitizing the tasks of the plurality of tasks, the affinitizing comprising generating threads for each of the tasks of the plurality of tasks, wherein a number of threads generated for each task of the plurality of tasks corresponds to the thread count for the task in the thread layout, and wherein each of the threads is assigned to a processor of the one or more respective preferred processors that are specified for the thread's task in the generated thread layout, wherein the first thread of the plurality of threads required to execute the first task is assigned to the first processor, and the second thread of the plurality of threads required to execute the first task is assigned to the second processor that is distinct from the first processor; and executing each of the tasks required to execute the application by the generated threads in parallel using the plurality of processors, wherein the first thread of the plurality of threads required to execute the first task is executed on the first processor, and the second thread of the plurality of threads required to execute the first task is executed on the second processor that is distinct from the first processor, wherein the first processor is not indicated as a preferred processor for the second thread of the plurality of threads required to execute the first task of the plurality of tasks, and wherein the second processor that is distinct from the first processor is not indicated as a preferred processor for the first thread of the plurality of threads required to execute the first task.

2. The computer program product as claimed in claim 1 wherein the thread layout is generated based on a specification of the application and a specification of the computer system.

3. A computer-implemented method for thread binding, the method comprising:

before starting execution of an application, generating, by a computer system, a thread layout for the application, wherein generating the thread layout for the application before starting execution of the application comprises:

determining a task count comprising a number of tasks required to execute the application, wherein a plurality of tasks is required to execute the application, and the task count corresponds to the number of the plurality of tasks;

determining a task rank for each task of the plurality of tasks;

determining a thread count for each task of the plurality of tasks, each thread count comprising a number of threads required to execute the thread count's respective task, wherein a thread count for a first task of the plurality of tasks is unequal to a thread count of a second task of the plurality of tasks; and indicating one or more preferred processors of a plurality of processors in the computer system for each task of the plurality of tasks, wherein a first task of the plurality of tasks requires a plurality of threads to execute, wherein a first processor is indicated as a preferred processor for a first thread of the plurality of threads required to execute the first task of the plurality of tasks, and wherein a second processor that is distinct from the first processor is indicated as a preferred processor for a second thread of the plurality of threads required to execute the first task;

allocating system resources, the system resources comprising the plurality of processors, for each of the tasks of the plurality of tasks based on the generated thread layout by affinitizing the tasks of the plurality of tasks, the affinitizing comprising generating threads for each of the tasks of the plurality of tasks, wherein a number of threads generated for each task of the plurality of tasks corresponds to the thread count for the task in the thread layout, and wherein each of the threads is assigned to a processor of the one or more preferred processors that are specified for the thread's task in the generated thread layout, wherein the first thread of the plurality of threads required to execute the first task is assigned to the first processor, and the second thread of the plurality of threads required to execute the first task is assigned to the second processor that is distinct from the first processor; and executing each of the tasks required to execute the application by the generated threads in parallel using the plurality of processors, wherein the first thread of the plurality of threads required to execute the first task is executed on the first processor, and the second thread of the plurality of threads required to execute the first task is executed on the second processor that is distinct from the first processor,
wherein the first processor is not indicated as a preferred processor for the second thread of the plurality of threads required to execute the first task of the plurality of tasks, and wherein the second processor that is distinct from the first processor is not indicated as a preferred processor for the first thread of the plurality of threads required to execute the first task.

4. The method as claimed in claim 3 wherein the thread layout is generated based on a specification of the application and a specification of the computer system.

* * * * *